United States Patent [19]

Steinhauser et al.

[11] Patent Number: 5,700,374
[45] Date of Patent: Dec. 23, 1997

[54] PERVAPORATION MEMBRANES AND USE THEREOF

[75] Inventors: Hermann A. Steinhauser, Friedrichshafen; Hartmut E. A. Brüschke, Nussloch, both of Germany

[73] Assignee: Deutsche Carbone AG, Frankfurt, Germany

[21] Appl. No.: 409,701

[22] Filed: Mar. 23, 1995

[30] Foreign Application Priority Data

Mar. 28, 1994 [DE] Germany .................. 44 10 763.3

[51] Int. Cl.$^6$ .................. B01D 15/00; B01D 29/00
[52] U.S. Cl. .................. 210/640; 210/490; 210/500.43; 210/654; 264/45.1
[58] Field of Search .................. 210/490, 500.43, 210/640; 264/45.1

[56] References Cited

U.S. PATENT DOCUMENTS

| | | | |
|---|---|---|---|
| 4,759,850 | 7/1988 | Farnand et al. | 210/654 |
| 4,774,365 | 9/1988 | Chen | 568/697 |
| 4,877,529 | 10/1989 | Pasternak et al. | 210/654 |
| 4,960,519 | 10/1990 | Pasternak et al. | 210/640 |
| 5,066,403 | 11/1991 | Dutta et al. | 210/638 |

*Primary Examiner*—Morton Foelak
*Attorney, Agent, or Firm*—Bardehle, Pagenberg, Dost, Altenburg, Frohwitter, Geissler

[57] ABSTRACT

A membrane comprising a pore-free separation layer, wherein the separation layer consists of poly-dimethyl aminoethyl methacrylate homopolymers or N-vinylpyrrolidone dimethyl aminoethyl methacrylate copolymer or N-vinylcaprolactam dimethyl aminoethyl methacrylate copolymer or N-vinylcaprolactam N-vinylpyrrolidone dimethyl aminoethyl methacrylate terpolymers.

12 Claims, No Drawings

PERVAPORATION MEMBRANES AND USE THEREOF

The present invention relates to a membrane, manufacture thereof and use thereof, and particularly to a composite membrane, processes for manufacture thereof and use thereof to separate simple alcohols, particularly ethanol, from mixtures with organic liquids by means of pervaporation and vapor permeation processes.

It is known that simple alcohols such as methanol, ethanol, and propanol are miscible with organic liquids without any miscibility gap, for example, with hydrocarbons, ethers, ketons, esters, amins, etc. It is further known that such mixtures can often only be separated with considerable effort by distillation, since azeotropic mixtures result. With these, the liquid phase has the same composition as the vapor being in equilibrium with it, a further distillative separation is not possible. It is known to the person skilled in the art that even in azeotropic compositions the simple alcohol can be separated from such mixtures by means of pervaporation and vapor permeation processes.

U.S. Pat. No. 4,774,365 describes a process for separating methanol from mixtures thereof with ethers and/or hydrocarbons, particularly from mixtures with methyl tertiary butyl ether (MTBE) and with tertiary amyl methyl ether, using a membrane made of cellulose acetate.

U.S. Pat. No. 4,877,529 describes the separation of methanol from mixtures with MTBE and dimethyl carbonate (DMC), the membranes used have separation layers consisting of polyvinyl alcohol (PVA) and PVA-polyacrylic acid mixtures.

U.S. Pat. No. 4,960,519 describes the separation of methanol from MTBE and DMC, the membranes used having separation layers consisting of PVA and PVA polyacrylic acid mixtures.

U.S. Pat. No. 5,066,403 describes the separation of ethanol from cyclohexane, the membrane consisting of polyperfluorosulfonic acid (Nafion®).

U.S. Pat. No. 4,759,850 teaches the separation of methanol from mixtures thereof with other organic liquids by reverse osmosis, wherein membranes consisting of cellulose acetate and polyolefins are used.

DE 4 234 521 describes a membrane consisting of a separation layer obtained by plasma polymerization, which is suitable for separating methanol from mixtures thereof with other organic liquids, for example, MTBE and DMC.

European patent application EP 92 117 467.8 describes a membrane consisting of cellulose esters and mixtures of cellulose esters with each other as well as with glycols, which is suitable for separation of methanol from organic mixtures.

However, the technical use of membranes according to prior art for separation of simple alcohols from organic mixtures is considerably limited. Cellulose acetate is soluble in many organic solvents, such as ethers, ketons and polyhydric alcohols, brought into contact with other solvents, it partially swells to the extent that the membranes are destroyed. Membranes having fixed ions alter their behavior very much, when brought into contact with water or salts. PVA membranes need a certain content of water in the feed mixture, otherwise the flow of alcohols will decrease considerably.

Surprisingly, it has been demonstrated that according to the present invention membranes can be produced, which at the same time show good selectivities and fluxes in separating simple alcohols such as methanol and propanol and particularly ethanol from mixtures with other organic liquids. The membranes according to the present invention show particularly good chemical stability at higher temperatures in technically important mixtures of simple alcohols with aliphatic and aromatic hydrocarbons, ethers, ketons, esters and higher alcohols. Selectivity and flow for alcohols are also high in the absence of water.

The present invention thus relates to membranes, the manufacture of membranes, and the use of membranes for separating simple alcohols from mixtures thereof with other organic components by pervaporation and vapor permeation.

The separation layer of the membrane according to the present invention consists of a film made of homo, co or terpolymers. Poly-N,N-dimethyl aminoethyl-methacrylate (poly-DMAEMA) is used as homopolymer, one consisting of DMAEMA and N-vinylpyrrolidone (NVP) or of DMAEMA and N-vinylcaprolactam (NVCL) is used as copolymer, and one consisting of DMAEMA, NVP, and NVCL is used as terpolymer. Particularly preferred are such polymers, in which the nitrogen atom of the amino group of DMAEMA is present as quaternary ammonium ion. Preferred quaternization reagents are dimethyl sulfate and diethyl sulfate as well as monochloromethane and monochloroethane, monoiodo- and monobromo methane and ethane.

If one denotes the molar proportion of DMAEMA with x, the one of NVP with y and the one of NVCL with z and applies a normation such that $x+y+z=1$, the value of x can be between 1 (homopolymersate) and 0.1, the values of y and z ranging from 0 to 0.9. In the copolymer ($z=0$ or $y=0$) values of x are preferred being between 0.2 and 0.8, particularly preferred are values between 0.4 and 0.6. For the terpolymer x, y, and z have preferably values between 0.2 and 0.5.

The average molar weight of the said homo, co- and terpolymer can vary within a broad range from 50,000 to 5,000,000 dalton, average molecular weights from 100,000 to 1,000,000 dalton being preferred.

For manufacture of said separation layer the homopolymer, co or terpolymer is dissolved in water, ethanol or water-ethanol mixtures. Depending on the molecular weight of the polymer, concentrations from 2% by weight to 50% by weight are preferred, particularly preferred are concentrations from 4% by weight to 20% by weight. The solution is spread over a substrate by a method known to a person skilled in the art, forming a liquid film having no defect. Spraying or transfer coating are the preferred application methods. After evaporating the solvents, a pore-free, dense polymer film is formed, the thickness of which depends upon the viscosity of the polymer solution and the application method. Preferred are polymer film thicknesses from 0.5 g to 20μ, particularly preferred are such from 1μ to 5μ.

Evaporation of the solvents is carried out preferably from 50° C. to 100° C. Thereafter the film is crosslinked by heat-treating, preferably at temperatures from 100° C. to 200° C., particularly preferred from 120° C. to 160° C., for times from 1 min. to 60 min. It has been shown to be advantageous to conduct the heat-treatment in several steps, a two step procedure being preferred, such that after evaporation of the solvents the treatment at 100° C. to 120° C. is e.g. 1 to 30 min., in a second step e.g. 1 to 30 min. at 110° C. to 200° C. By heat-treating, the polymer film becomes insoluble in water and ethanol.

The membrane according to the present invention can comprise the pore-free separation layer alone. Preferably the pore-free separation membrane is on a porous support layer.

It has been proved to be particularly preferable to apply the polymer film of the present invention on a composite structure as a separation layer. Such composite structures or composite membranes are known to the person skilled in the art. They consist of a substrate layer, e.g. a fleece or fabric made of polyester, polypropylene, polyethylene, polyamide, polyphenylene sulfide, polysulfone, or other polymers, metal, glass or carbon. Situated on the said substrate layer, there is a porous support layer with asymmetrical pore structure, support layers consisting of polyacrylonitrile, polysulfone, polyvinylidene difluoride, polyamide, cellulose, and polyether imide being preferred. In addition the person skilled in the art also knows other support and substrate layers. A pore-free layer is applied on the porous support layer in a way known to the person skilled in the art as actual separation layer of the membrane.

The following examples illustrate the invention:

EXAMPLE 1

A solution consisting of 7% by weight of polydimethyl aminoethyl methacrylate (DMAEMA) in a mixture of water and ethanol at a ratio of 1:1 is coated by spraying on a porous support layer made of polyacrylonitrile (PAN) which has an asymmetrical pore structure and is, in turn, applied on a substrate layer made of a polyester fleece. The solvent is evaporated in 2 min. at 80° C. After evaporating the solvent, the membrane is heat-treated for 15 min. at 150° C. The separation layer of the final membrane has a thickness of 3μ. In a pervaporation test, it was tested at 60° C. with a feed mixture of 20% by weight of ethanol and 80% by weight of ethyl tertiary butyl ether (ETBE). A permeate of 98.2% by weight of ethanol is obtained, the flow is 0.92 kg/m²h at a permeate side pressure of 6 mbar, the permeate being condensed with a dry ice-ethanol mixture.

EXAMPLE 2

A solution of a copolymer made of N-vinylpyrrolidone and DMAEMA is applied on the same substructure as in example 1. The molar ratio of both monomers in the copolymer is 1:1, using a solution of 10% by weight of the copolymer in water. After application, the solvent is evaporated within 2 min. at 90° C., thereafter the membrane is heat-treated for 30 min. at 125° C. With a feed of 75% by weight of ETBE and 25% by weight ethanol, a pervaporation test resulted in a flow of 6.2 kg/m² h at 95° C., the permeate consisting of 94.7% by weight of ethanol. The permeate side pressure is 20 mbar, the condensation of the permeate occurs at 0° C.

EXAMPLE 3

A solution of a copolymer made of NVP and DMAEMA is applied on a porous substructure made of polyvinyl difluoride (PVDF) being on a substrate made of a polyphenylene sulfide (PPS) fleece. The amino group of DMAEMA is quaternized with diethyl sulfate, the molar ratio of NVP to quaternized DMAEMA is 3:2, a solution of 4.5% of said copolymer in water is used. After application, the solvent is evaporated within 2 min. at 80° C. and the membrane is first heat-treated at 115° C. for 10 min. and then at 150° C. for 5 min. In the pervaporation test, with 20% by weight of ethanol and 80% by weight toluene as a feed, a permeate consisting of 98.8% by weight of ethanol is obtained, the flow is 2.5 kg/m² h at 80° C., the permeate side pressure is 20 mbar, the permeate is condensed at 0° C.

EXAMPLE 4

A solution of a terpolymer made of N-vinylcaprolactame, NVP, and DMAEMA, the latter being quaternized with methyl chloride, is applied on the PAN substructure as in example 1 as solution of 5% by weight in water. The molar ratio of NVCl, NVP and DMAEMA is 0.3:0.3:0.4. After evaporating the solvent within 0.5 min. at 95° C., heat-treatment at 120° C. for 10 min. and at 145° C. for 8 min. is carried out.

In a pervaporation test, with 20% of ethanol and 80% n-heptane as a feed, a permeate consisting of 99.2% by weight of ethanol is obtained, the flow is 1.8 kg/m² h at 80° C., the permeate side pressure is 5 mbar, the permeate is condensed with dry ice-ethanol.

EXAMPLE 5

In a pervaporation test, with a mixture of 5% methanol and 95% n-heptane at 55° C. a membrane according to example 4 results in a permeate of 99.8% methanol and a flow of 2.3 kg/m² h. Under same conditions, with an infeed of 10% propanol-2 and 90% n-heptane, a permeate of 92.7% propanol-2 is obtained, the flow being 0.8 kg/m² h. In both tests the permeate side pressure is 5 mbar, the permeate is condensed with dry ice-ethanol.

What is claimed is:

1. A method of separating one or more alcohols from a mixture with other organic fluids by pervaporation or vapor permeation utilizing a membrane with a pore-free separation layer, said layer selected from the group consisting of poly-dimethyl aminoethyl methacrylate homopolymers, N-vinylpyrrolidone dim ethyl aminoethyl methacrylate copolymers, N-vinylcaprolactam dimethyl aminoethyl methacrylate copolymers, or N-vinylcaprolactam N-vinylpyrrolidone dimethyl aminoethyl methacrylate terpolymers.

2. A method according to claim 1, wherein the alcohol permeates the membrane and is methanol, ethanol, or propanol, and the other organic fluid retained by the membrane is an aliphatic or aromatic hydrocarbon, an ether, ketone, ester or higher alcohol or a mixture of at least two thereof.

3. A method according to claim 1, wherein the alcohol is ethanol and the other organic fluid is ethyl tertiary butyl ether.

4. A method according to claim 1, wherein the amino group of said dimethyl aminoethyl methacrylate is quaternized.

5. A method according to claim 4, wherein said amino group is quaternized with monohalomethane and monohaloethane.

6. A method according to claim 4, wherein said amino group is quaternized with mono methyl sulfate, mono ethyl sulfate, dimethyl sulfate, or diethyl sulfate.

7. A method according to claim 1, wherein the pore-free separation layer is located on a porous support layer, which, in turn, is located on a porous substrate layer.

8. A method according to claim 1, wherein said membrane with pore-free separation layer is manufactured by applying said homo, or terpolymers as water, ethanol, or ethanol and water mixture solutions to a porous substructure having an asymmetrical pore structure which, in turn, lies on a substrate layer.

9. A method according to claim 8, wherein after application of the polymer solution, the solvent is evaporated and the membrane is subjected to heat-treatment.

10. A method according to claim 9, wherein the heat-treatment is carried out at temperatures ranging from about 100° C. to about 200° C., within about 1 minute to about 60 minutes.

11. A method according to claim 9, wherein the heat-treatment is carried out at a temperature from about 120° C. to about 160° C. within about 5 minutes to about 30 minutes.

12. A method according to claim 10, wherein said heat-treatment is carried out in more than one step such that the temperature of the following step is higher than the temperature of the preceding step.

* * * * *